United States Patent [19]

Chancel

[11] 4,215,812

[45] Aug. 5, 1980

[54] MAGNETIC INFORMATION CARRIER

[75] Inventor: Georges Chancel, Saint-Peray, France

[73] Assignee: Crouzet, Paris, France

[21] Appl. No.: 4,598

[22] Filed: Jan. 18, 1979

[30] Foreign Application Priority Data

Jan. 24, 1978 [FR] France .................. 78 02257

[51] Int. Cl.² .................... G06K 19/06; G11B 25/04
[52] U.S. Cl. ........................... 235/493; 360/2
[58] Field of Search .............. 235/493, 449, 450; 360/2; 340/149 A, 149 R; 40/2.2

[56] References Cited

U.S. PATENT DOCUMENTS

| | | | |
|---|---|---|---|
| 3,221,428 | 12/1965 | Fischler | 40/2.2 |
| 3,599,153 | 8/1971 | Lewis | 340/149 A |
| 3,778,598 | 12/1973 | Eberly | 340/149 A |
| 3,860,796 | 1/1975 | Wallace | 360/2 |
| 3,878,367 | 4/1975 | Fayling | 235/493 |

Primary Examiner—Robert M. Kilgore
Attorney, Agent, or Firm—Holman & Stern

[57] ABSTRACT

A magnetic information carrier comprising two magnetic tracks. One track contains coded magnetic information and the other track is deposited in depressions formed in the carrier and filled with a magnetic liquid, for displaying some of the coded magnetic information of the first track.

1 Claim, 2 Drawing Figures

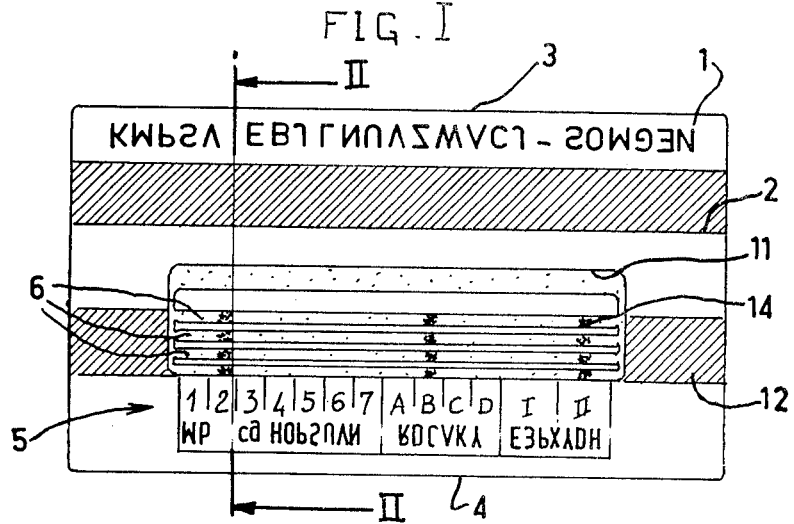
FIG. I
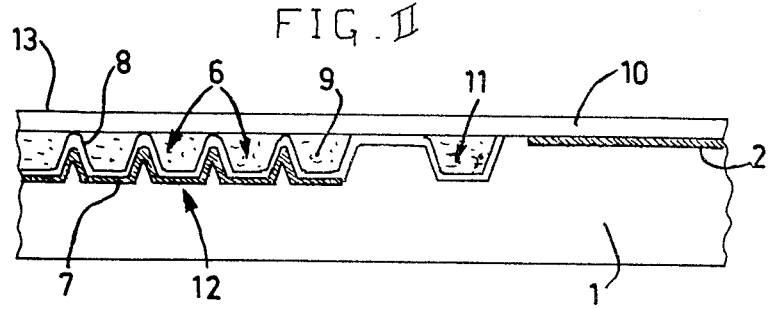
FIG. II

MAGNETIC INFORMATION CARRIER

BACKGROUND OF THE INVENTION

The present invention relates to a magnetic information carrier comprising two magnetic tracks, and in which at least some of the magnetic information of the carrier may be displayed due to the positioning of zones of concentration of magnetic particles of a liquid and due to other readable information printed on the carrier.

More precisely, the present invention relates to a magnetic information carrier adapted to be used by the public for a certain period of time, such as for example a credit card or a weekly card for use in public transport.

At present, cards used in public transport are generally made of cardboard, with one or more magnetic tracks. As they are used, the magnetic information contained on these cards vary, the variation of this information being displayed or explained with the aid of other information, which is not-magnetic and consequently understandable to the holders of these cards, printed on these cards.

The readable information defined hereinabove may easily be printed on paper or cardboard cards. However, such cards are particularly fragile, due to the very nature of their constitution, and the mere fact of folding them or creasing them may render them magnetically unusable. In fact, the cards carrying magnetic information adapted to be used over a relatively long period are rathermore made of an at least relatively rigid material, particularly plastics material. However, these latter cards, made of plastics material, which are less fragile, in turn present the drawback, with respect to paper or cardboard cards, of retaining a printing ink less easily.

The present invention therefore relates to a magnetic information carrier which is not fragile, and on which it is easy to print readable information intended to display variable magnetic information.

British Pat. No. 1,427,517 already discloses a magnetic information carrier substantially of the type mentioned hereinabove. However, this support comprises only one magnetic track, which is prejudicial to a good use of this carrier and, moreover, its rigidity is not completely satisfactory.

SUMMARY OF THE INVENTION

It is therefore an object of the present invention to improve such a carrier, by eliminating the two drawbacks mentioned hereinabove.

To this end, the present invention relates to a magnetic information carrier of the type mentioned hereinabove, characterized in that one of the two tracks is a track containing coded magnetic information, and the other of the two tracks is a track for displaying at least some of said coded magnetic information, this display track being deposited in a series of parallel longitudinal depressions formed in the carrier and filled with the magnetic liquid.

Due to the coded information track of the carrier according to the invention, this latter is very versatile and, due to its depressions, it has a structure of a rigidity particularly well adapted to the use which is to be made thereof.

BRIEF DESCRIPTION OF THE DRAWINGS

The invention will be more readily understood on reading the following description with reference to the accompanying drawings, in which:

FIG. 1 shows a plan view of the preferred embodiment of the carrier of the invention, and FIG. 2 shows, on a larger scale, a sectional view through part of the carrier of FIG. 1, along line II—II.

DETAILED DESCRIPTION OF THE PREFERRED EMBODIMENT

Referring now to the drawings, the carrier, or card, of the invention, shown in FIGS. 1 and 2, is formed from a substrate 1 of plastics material, on the surface of which is deposited a first magnetic track 2, in known manner, in the longitudinal direction of the carrier, i.e. in the direction of advance motion of the carrier, near a longitudinal edge 3 of the carrier. Readable information 5 constituted by letters and numbers forming a display scale is printed, on the surface of the substrate 1, near the longitudinal edge 4 opposite the edge 3 of the carrier.

A series of longitudinal depressions 6, parallel to the track 2, are formed on the surface of the substrate 1, near the information 5, between this information 5 and the track 2.

A metal layer 7 has been deposited, in known manner, in the depressions 6. In the present case, it is a thick layer of the NICO type, of high induction, preferably lower than 2000 teslas, i.e. $2.10^7$ gauss.

The metal layer 7 is covered with a reflecting layer 8, preferably white, adapted to increase the optical contrast.

The depressions 6, obtained for example by stamping, have been formed preferably after the deposit of layers 7 and 8. They have been filled with a magnetic liquid 9, then closed by a transparent film 10, preferably hot welded or glued on the surface of the carrier of the invention. The layers 7 and 8 and the liquid 9 form a display track 12.

A larger cavity 11, in communication with the depressions 6 (FIG. 1) serves, in known manner, as expansion reservoir for the surplus of liquid in the depressions 6. It will be noted that the metal layer 7 does not extend into the cavity 11.

In the example described and illustrated in the drawings, the initial thickness of the substrate 1, i.e. its thickness at the level of track 2, is equal to about 0.5 mm, the thickness of the metal layer 7 is equal to about ten microns, and the thickness of the reflecting layer 8 is less than 20 microns. The depressions 6 have a depth of about 0.2 mm and a width of about 0.5 mm. The transparent film 10 has a thickness of about 0.1 mm.

The track 2 contains coded magnetic information, which is variable, representing, for example in the case of a weekly card used in public transport, a maximum number of journeys still to be made, the tariff, class, etc. Thus, upon each journey, the track 2 is read in an apparatus, is erased, then re-recorded with new coded information, all these operations being effected in known manner.

The coded magnetic information contained in the track 2 not being accessible to the holder of the carrier card, some of this information, or even all of it, if desired, is also contained in the metal layer 7 of the track 12, to provoke the concentration of the magnetic particles of the liquid 9. These magnetic particles are concentrated in columns 14 which, the layer 7 being less than 0.3 mm from the upper surface 13 of the carrier of the invention (FIG. 1), appear very clearly on the upper surface 13, on the white background of the layer 8, at spots which vary in the course of use of this carrier. These columns of particles 14 therefore represent magnetic bits of which the meaning is given by the corresponding printed information 5 opposite which it appears. In the example shown, thirteen columns 14 have thus been provided, which may appear opposite the different numbers and letters of the display scale 5.

Due to the series of depressions 6 formed in the carrier of the invention, this latter presents an excellent rigidity, much greater than that which one wide depression would procure.

In addition, the carrier of the invention, with its two magnetic tracks 2 and 12, may be used in very good conditions.

What I claim is:

1. A magnetic information carrier comprising two magnetic tracks, and in which at least some magnetic information of the carrier may be displayed, due to the positioning of zones of concentration of magnetic particles of a liquid and due to other readable information printed on the carrier, characterized in that one of the two tracks is a track containing coded magnetic information and the other of the two tracks is a track for displaying at least some of said coded magnetic information, said display track being deposited in a series of parallel longitudinal depressions formed in the carrier and filled with said magnetic liquid.

* * * * *